United States Patent
Patel

(10) Patent No.: US 10,636,213 B2
(45) Date of Patent: Apr. 28, 2020

(54) GRAPHICS PROCESSING SYSTEMS

(71) Applicant: Arm Limited, Cambridge (GB)

(72) Inventor: Nikunj Kaushik Patel, Cambridge (GB)

(73) Assignee: Arm Limited, Cambridge (GB)

(*) Notice: Subject to any disclaimer, the term of this patent is extended or adjusted under 35 U.S.C. 154(b) by 22 days.

(21) Appl. No.: 15/770,322

(22) PCT Filed: Aug. 5, 2016

(86) PCT No.: PCT/GB2016/052432
§ 371 (c)(1),
(2) Date: Apr. 23, 2018

(87) PCT Pub. No.: WO2017/072476
PCT Pub. Date: May 4, 2017

(65) Prior Publication Data
US 2018/0315245 A1    Nov. 1, 2018

(30) Foreign Application Priority Data
Oct. 26, 2015 (GB) .................................. 1518908.7

(51) Int. Cl.
*G06T 19/00* (2011.01)
*G06T 15/04* (2011.01)
(Continued)

(52) U.S. Cl.
CPC .............. *G06T 19/006* (2013.01); *G06T 7/40* (2013.01); *G06T 15/04* (2013.01); *G06T 15/50* (2013.01); *G06T 2210/12* (2013.01)

(58) Field of Classification Search
None
See application file for complete search history.

(56) References Cited

U.S. PATENT DOCUMENTS

| 5,870,097 A | 2/1999 | Snyder |
| 6,563,508 B1 | 5/2003 | Oka |

(Continued)

FOREIGN PATENT DOCUMENTS

| CA | 2737575 | 10/2012 |
| EP | 1508877 | 2/2005 |

(Continued)

OTHER PUBLICATIONS

Laszlo Szirmay-Kalos, et al., "Approximate Ray-Tracing on the GPU with Distance Imposters," Eurographics, vol. 24, No. 3, pp. 695-701 (Year: 2005).*

(Continued)

*Primary Examiner* — William A Beutel
(74) *Attorney, Agent, or Firm* — Vierra Magen Marcus LLP

(57) ABSTRACT

In a graphics processing system, a first bounding volume (20) representative of the volume of all or part of a scene to be rendered is defined. Then, when rendering a scene for output, an intersection position (27) for a vector (24) with the first bounding volume (20) is determined by determining the position (51) intersected by the vector (24) on a second bounding volume (50) associated with the first bounding volume (20), using the determined position (51) to determine information indicative of an intersection position (27) for the first bounding volume (20) and the vector (24), and using the determined information to determine an intersection position (27) for the vector (24) with the first bounding volume (20).

18 Claims, 6 Drawing Sheets

(51) Int. Cl.
G06T 15/50 (2011.01)
G06T 7/40 (2017.01)

(56) References Cited

U.S. PATENT DOCUMENTS

| | | | |
|---|---|---|---|
| 6,876,362 | B1 | 4/2005 | Newhall |
| 6,999,078 | B1 | 2/2006 | Akerman |
| 6,999,080 | B1 | 2/2006 | Ungar |
| 7,675,518 | B1 | 3/2010 | Miller |
| 8,773,433 | B1 | 7/2014 | Smyrl |
| 9,280,848 | B1 | 3/2016 | Chen |
| 9,741,159 | B2 | 8/2017 | Hazel |
| 9,842,424 | B2 | 12/2017 | Hecht |
| 2002/0018063 | A1 | 2/2002 | Donovan |
| 2003/0052891 | A1 | 3/2003 | Bragg |
| 2003/0085895 | A1 | 5/2003 | Oka |
| 2005/0041023 | A1 | 2/2005 | Green |
| 2005/0093857 | A1 | 5/2005 | Wang |
| 2006/0274065 | A1* | 12/2006 | Buyanovskiy .......... G06T 15/06 345/424 |
| 2006/0279570 | A1 | 12/2006 | Zhou |
| 2007/0139408 | A1 | 6/2007 | Keranen |
| 2007/0257911 | A1 | 11/2007 | Bavoil |
| 2008/0024491 | A1 | 1/2008 | Sathe |
| 2009/0213144 | A1 | 8/2009 | Dokken et al. |
| 2010/0134516 | A1 | 6/2010 | Cooper |
| 2010/0295851 | A1 | 11/2010 | Diamand |
| 2012/0094773 | A1 | 4/2012 | Suzuki |
| 2015/0228110 | A1 | 8/2015 | Hecht |
| 2015/0269768 | A1 | 9/2015 | Sohn et al. |
| 2017/0069129 | A1 | 3/2017 | Mendez |
| 2017/0161917 | A1 | 6/2017 | Bala |
| 2018/0033191 | A1 | 2/2018 | Mendez |

FOREIGN PATENT DOCUMENTS

| | | |
|---|---|---|
| GB | 2528655 | 2/2016 |
| GB | 2543766 A | 5/2017 |
| JP | 2011-1138445 A | 7/2011 |
| KR | 100700307 B1 | 3/2007 |
| WO | WO 2008/037599 | 4/2008 |
| WO | 2017072476 A1 | 5/2017 |

OTHER PUBLICATIONS

Wang, Youyou, et al., "A Compact Representation for 3D Animation Using Octrees and Affine Transformations", Hindawi Publishing Corp, International Journal of Digital Multimedia Broadcasting, vol. 2010, Article ID 924091 (Year: 2010).*
PCT International Search Report and Written Opinion dated Apr. 29, 2016, PCT Patent Application No. PCT/GB2016/050498.
GB Search Report dated Aug. 25, 2015, GB Patent Application No. GB1503386.3.
GB Search Report dated Aug. 25, 2015, GB Patent Application No. GB1503391.3.
Behc, "Box Projected Cubemap Environment Mapping," Graphics and GPU Programming, Apr. 20, 2010.
Bjorke, "Image-Based Lighting," GPU Gems, Chapter 19, NVIDIA Corporation, 2004.
"Environment Mapping Techniques," The Cg Tutorial, Chapter 7, NVIDIA Corporation, 2003.
Ihrke, et al., "Eikonal Rendering: Efficient Light Transport in Refractive Objects," SIGGRAPH 2007 Conference Aug. 2007.
Sebastien Lagarde, Version 1.28 Living blog on "Image-based Lighting approaches and parallax-corrected cubemap, SIGGRAPH 2012," seblarde.wordpress.com, Sep. 29, 2012.
Sousa, "Generic Refraction Simulation," GPU Gems, Chapter 19, NVIDIA Corporation, 2005.
GB Combined Search and Examination Report dated Feb. 25, 2016, GB Patent Application GB1518908.7.
PCT International Search Report dated Nov. 7, 2016, PCT Patent Application No. PCT/GB2016/052432.
PCT Written Opinion of the International Searching Authority dated Nov. 7, 2016, PCT Patent Application No. PCT/GB2016/052432.
Laszlo Szirmay-Kalos, et al., "Approximate Ray-Tracing on the GPU with Distance Imposters," Computer Graphics Forum, vol. 24 No. 3, Sep. 1, 2005.
Laszlo Szirmay-Kalos, et al., "Specular Effects on the GPU: State of the Art," Computer Graphics Forum, vol. 28 No. 6, Sep. 1, 2009.
Roberto Lopez Mendez, "Reflections based on local cubemaps in unity," ARM Mali Graphics 2014, Aug. 7, 2014.
Sebastien Lagarde et al., "Local Image-based Lighting with Parallax-corrected Cubemap," GamesConnection, Nov. 30, 2012.
Shengying Li, et al., "Real-time Reflection using Ray Tracing with Geometry Field," Eurogrphics 2006 Conference, Short Papers, Sep. 4-8, 2006, Vienna, Austria.
PCT International Search Report dated Dec. 17, 2015, PCT Patent Application PCT/GB2015/052054.
PCT Written Opinion of the International Searching Authority dated Dec. 17, 2015, PCT Patent Application PCT/GB2015/052054.
Friedrich A. Lohmueller: "Textures with POV-Ray—Transparency mapping I", Jan. 20, 2013 (Jan. 20, 2013), XP055235051, Retrieved from the Internet: URL:https://web.archive.org/web/20130120200610/http://f-lohmueller.de/pov_tut/tex/tex_885e.htm, the whole document figures 1-3.
Friedrich A. Lohmueller: "Textures with POV-Ray—Transparency mapping II", Jan. 20, 2013 (Jan. 20, 2013), XP055235064, Retrieved from the Internet: URL:https://web.archive.org/web/20130120200631/http://f-lohmueller.de/pov_tut/tex/tex_886e.htm—the whole document.
Sebastien Lagarde, et al.: "Local Image-based Lighting with Parallax-corrected Cubemap", GamesConnection, Nov. 30, 2012 (Nov. 30, 2012), XP055235164, Retrieved from the Internet: URL:https://seblagarde.files.wordpress.com/2012/08/parallax_corrected_cubemap-gameconnection2012.pdf—the whole document p. 23.
Sebastien Lagarde, et al.: "Local image-based lighting with parallax-corrected cubemaps", SIGGRAPH '12 ACM SIGGRAPH 2012 Talks, ACM, 2 Penn Plaza, Suite 701 New York NY 10121-0701 USA, Aug. 5, 2012 (Aug. 5, 2012), p. 1, XP058008298, DOI: 10.1145/2343045.2343094 ISBN: 978-1-4503-1683-5 the whole document abstract.
GB Search Report dated Jan. 21, 2015, GB Patent Application No. GB1413145.2.
Bunnell, et al., Chapter 11. Shadow Map Antialiasing, Sep. 2007, Retrieved from the Internet: URL: http://http.developer.nvidia.com/GPUGems/gpugems_ch11.html.
Bjorke, Chapter 19. Image Based Lighting, Sep. 2007, Retrieved from the Internet: URL: http://http.developer.nvidia.com/GPUGems/gpugems_ch19.html.
Tutorial on Shadow Mapping, Paul's Projects, 2002/2003 Retrieved from the Internet: URL: http://www.paulsprojects.net/tutorials/smt/smt.html.
Everitt, "Projective Texture Mapping," NVIDIA, Dec. 2015, Retrieved from the Internet: URL: www.cse.unsw.edu.au/~cs9018/readings/projective_texture_mapping.pdf.
Notice of Allowance dated Dec. 26, 2018, U.S. Appl. No. 15/325,700, filed Jan. 11, 2017.
Office Action dated Nov. 9, 2018, U.S. Appl. No. 15/551,846.
Notice of Allowance dated Jun. 15, 2018, U.S. Appl. No. 15/247,272.
Office Action dated Jun. 27, 2018, U.S. Appl. No. 15/325,700.
Search Report dated Feb. 1, 2016, UK Patent Application No. GB1515723.3.
Engelhardt, "Epipolar Sampling for Shadows and Crepuscular Rays in Participating Media with Single Scattering," Proceedings of the 2010 Symposium on Interactive 3D Graphics and Games, Feb. 2010.
Kenny Mitchell, "Volumetric Light Scattering as a Post-Process," GPU Gems 3, Feb. 2008, NVIDIA Corporation, http://http.developer.nvidia.com/GPUGems3/gpugems3_ch13.html.
Skals, "Real-time Scattering," Feb. 28, 2012, www2.imm.dtu.dk/pubdb/views/.../imm6267.pdf.
Toth, et al., "Real-time Volumetric Lighting in Participating Media," The Eurographics Association Mar. 2009, http://sirkan.iit.bme.hu/~szirmay/lightshaft_link.htm.

(56) References Cited

OTHER PUBLICATIONS

Mitchell, "Light Shafts: Rendering Shadows in Participating Media," ATI Research, Inc., Game Developers Conference, Mar. 2004.
Dobashi, et al., "Interactive Rendering Method for Displaying Shafts of Light," Oct. 2000, http://ime.ist.hokudai.ac.jp/~doba/papers/pg00.pdf.
Prast, et al., "Caustics, Light Shafts, God Rays," Institute of Computer Graphics and Algorithms, Vienna, University of Technology, Feb. 2013, https://old.cg.tuwien.ac.at/research/publications/2013/Prast_Stefanie_2013-CLG/Prast_Stefanie_2013-CLG-Thesis.pdf.
Keller, et al., "Interleaved Sampling," Proceedings of the 12th Eurographics Workshop on Rendering Techniques, London, UK, Jun. 2001, http://cs.ubc.ca/labs/imager/tr/2001/keller2001a/keller.2001a.pdf.
Shin, et al., "Rendering Particles in a Shaft of Light," Jul. 2011, http://www.csee.umbc.edu~olano/class/635-11-2/shin7.pdf.
Nilsson, "Two Hybrid Methods of Volumetric Lighting," Lund University, Mar. 20, 2008, http://fileadmin.cs.lth.se/graphics/theses/projects/volumetric/thesis.pdf.
"White Paper: Volume Light," NVIDIA Corporation, Jan. 2008, http://developer.download.nvidia.com/SDK/10.5/direct3d/Source/VolumeLight/doc/VolumeLight.pdf.
Notice of Allowance dated Jan. 23, 2018, in U.S. Appl. No. 15/247,272.
Nishita, "A Shading Model for Atmospheric Scattering Considering Luminous Intensity Distribution of Light Sources", ACM, Computer GRaphics, vol. 21, No. 4, Jul. 1987, pp. 303-310.
Amendment dated Sep. 12, 2018, U.S. Appl. No. 15/325,700, filed Jan. 11, 2017.
Office Action dated Mar. 21, 2019, U.S. Appl. No. 15/551,846.
Chris Wyman, "An Approximate Image-Space Approach for Interactive Refraction", Jul. 2005, ACM, ACM Transactions on Graphics (TOG), vol. 24 Issue 3, pp. 1050-1053.
Chris Wyman, "An Approximate Image-Space Approach for Interactive Refraction", Jul. 2005, ACM, ACM Transactions on Graphics (TOG), vol. 24 Issue 3, Presentation Video, https://dl.acm.org/ft_gateway.cfm? id=107331 O&ftid=9796478&dwn=1.
Chris Wyman, "Interactive Image-Space Refraction of Nearby Geometry", Dec. 2, 2005, ACM, Proceeding GRAPHITE '05 Proceedings of the 3rd international conference on Computer graphics and interactive techniques in Australasia and South East Asia, pp. 205-211.
Chris Brennan, "Accurate Reflections and Refractions by Adjusting for Object Distance", 2002, Wordware Publishing, Inc., Direct3D ShaderX: Vertex and Pixel Shader Tips and Tricks, ed. Wolfgang F. Engel, pp. 290-294.
Stefan Seipel, Anders Nivfors, "Efficient Rendering of Multiple Refractions and Reflections in Natural Objects", Nov. 22, 2006, Linkoping University Electronic Press, SIGRAD 2006. The Annual SIGRAD Conference; Special Theme: Computer Games, Issue 19, Article 1, pp. 1-6.
Erik Lindholm, Mark J Kilgard, Henry Moreton, "A User-Programmable Vertex Engine", 2001, ACM, Proceeding SIGGRAPH '01 Proceedings of the 28th annual conference on Computer graphics and interactive techniques, pp. 149-158.
Ziyad S. Hakura, John M. Snyder, "Realistic Reflections and Refractions on Graphics Hardware With Hybrid Rendering and Layered Environment Maps", 2001, Springer, In: Gortler S.J., Myszkowski K. (eds) Rendering Techniques 2001, pp. 289-300.
Response to Office Action dated Sep. 19, 2019, U.S. Appl. No. 15/551,846.

\* cited by examiner

GRAPHICS PROCESSING SYSTEMS

BACKGROUND

The technology described herein relates to graphics processing systems and in particular to methods of and apparatus for determining the position on a volume intersected by a vector when rendering images for display.

When rendering images, such as output frames, for display in graphics processing systems, it can often be necessary to determine the position on a volume intersected by a vector. For example, in environment mapping (e.g. reflection mapping) techniques, the position on a bounding volume intersected by a (e.g. reflected) vector is determined. The intersection position is then used to determine a sampling vector to be used to sample a graphics texture that represents the surface of the bounding volume.

In these techniques, the bounding volume is used to approximate the environment (e.g. room) of the scene being rendered. Typically, a relatively simple bounding volume, such as a bounding box (a cube) or a bounding sphere, is used so that the intersection point can be analytically determined in real-time (at run time) in a relatively simple and efficient manner.

While these techniques can be effective where the environment of the scene being rendered corresponds closely to the, e.g. cubic or spherical, bounding volume being used (e.g. to a box or sphere), it can often be the case that the bounding volume does not match exactly to the surface of the scene being defined. This can cause noticeable errors in the rendered image, e.g. in the reflections, generated using the environment mapping technique.

The Applicants believe therefore that there remains scope for improved graphics processing techniques where the position on a volume intersected by a vector is determined.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
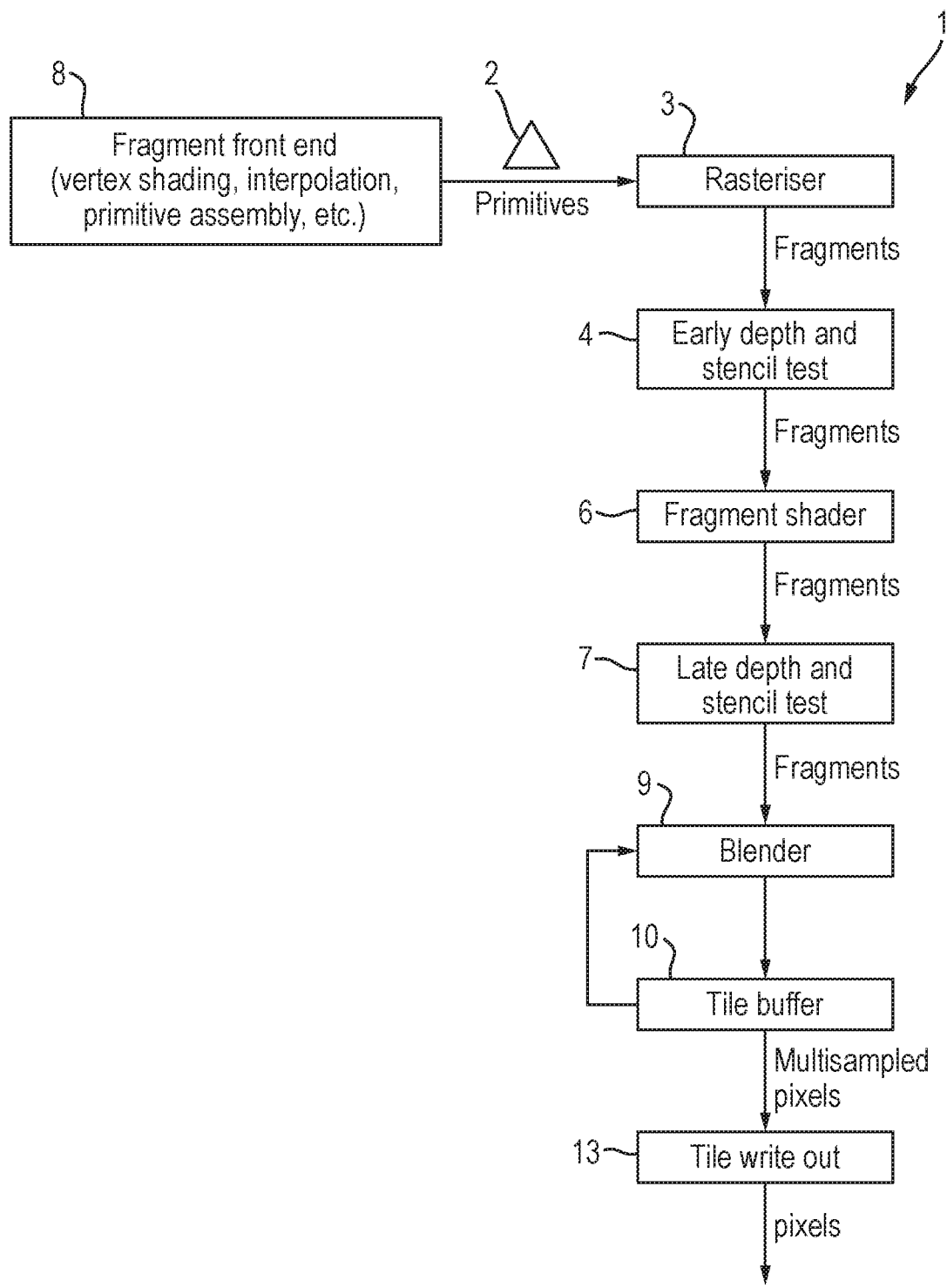
FIG. 1 shows schematically a graphics processing pipeline that can be operated in the manner of the technology described herein.

A first embodiment of the technology described herein comprises a method of operating a graphics processing system when rendering a scene for output, in which a first bounding volume representative of the volume of all or part of the scene to be rendered is defined; the method comprising:

determining an intersection position for a vector with the first bounding volume by:

determining the position intersected by the vector on a second bounding volume associated with the first bounding volume;

using the determined position to determine information indicative of an intersection position for the first bounding volume and the vector; and using the determined information to determine an intersection position for the vector with the first bounding volume.

A second embodiment of the technology described herein comprises a graphics processing unit comprising:

processing circuitry configured to determine an intersection position for a vector with a first bounding volume representative of the volume of all or part of a scene to be rendered:

determining the position intersected by the vector on a second bounding volume associated with the first bounding volume; and using the determined position to determine information indicative of an intersection position for the first bounding volume and the vector; and using the determined information to determine an intersection position for the vector with the first bounding volume.

The technology described herein is directed to a method of and apparatus for determining an intersection position for a bounding volume and a vector. In the technology described herein, to determine an intersection position for a vector with a first bounding volume, instead of "directly" determining the position intersected by the vector on the first bounding volume, the position intersected by the vector on a second bounding volume associated with the first bounding volume is firstly determined. The so-determined intersection position is used to determine information indicative of an intersection position for the first bounding volume and the vector, and the determined information is used to determine the intersection position for the vector with the first bounding volume.

As will be discussed further below, the Applicants have recognised that this arrangement can be used to determine an intersection position for an arbitrary volume and a vector in a particularly convenient and efficient manner (e.g. when compared with "directly" determining the position intersected by the vector on the volume in question). Moreover, this means that the technology described herein can allow the first bounding volume that represents the volume of all or part of the scene, e.g. in environment mapping techniques, to take a relatively complex shape, e.g. so as to correspond more closely to the (surface of the) environment of the scene being rendered (e.g. where the environment is not simply a box or a sphere), without significantly increasing the processing required for determining the intersection position for that bounding volume and the vector. This can accordingly simplify the processing required for determining the position on a bounding volume intersected by a vector, e.g. for use in determining a sampling vector to be used to sample a graphics texture that represents the surface of the bounding volume in environment mapping techniques.

The technology described herein can accordingly significantly reduce the processing required as compared to conventional graphics processing techniques and/or can provide enhanced rendering quality. This can be particularly useful for rendering images on, e.g., a mobile device that may have limited processing capacity.

The first bounding volume that is defined and used in the technology described herein may represent the entire scene that is being rendered (and in one embodiment this is the case), but it would also be possible for the bounding volume to represent only a part of the scene. The first bounding volume may, for example, represent a room or some other environment of the scene to be rendered.

The first bounding volume can be defined in any desired and suitable manner. It is in an embodiment defined in world space.

The first bounding volume can take any suitable and desired form. The first bounding volume in an embodiment comprises a convex volume, i.e. such that for any two points within the bounding volume, every point on the straight line segment that joins the two points is also within the first bounding volume. However, it would also be possible for the first bounding volume to comprise a shape that is not "strictly" convex in this sense. For example, the first bounding volume could comprise a (substantially convex) volume having one or more holes. As will be described in more detail below, the one or more holes in the first bounding volume could be used, e.g. to represent windows in the environment (e.g. room) of the scene being rendered.

The first bounding volume could be in the form of a bounding box (a cube), or a bounding sphere. However, the first bounding volume could also be (and in an embodiment is) in the form of any other shape (i.e. other than (not) a box or a sphere) and/or a more complex shape (and indeed, as discussed above the technology described herein is particularly advantageous in that the first bounding volume can take any arbitrary shape). The first bounding volume in an embodiment corresponds closely to the environment of (to a surface of) the scene being rendered.

The second bounding volume that is defined and used in the technology described herein should be associated with the first bounding volume. The second bounding volume can be defined in any desired and suitable manner. It is in an embodiment defined in world space.

The second bounding volume should be (and in an embodiment is) configured such that the vector will intersect with the second bounding volume (thus, the second bounding volume should be (and in an embodiment is) configured such that the origin of the vector is within the second bounding volume). The second bounding volume in an embodiment at least partially overlaps the first bounding volume. The second bounding volume is in an embodiment centred on the first bounding volume. The second bounding volume in an embodiment encompasses (bounds) the first bounding volume (i.e. such that the origin of the vector will be within the second bounding volume where the origin of the vector is within the first bounding volume), although it would also be possible for the second bounding volume to only partially encompass (partially bound) the first bounding volume, to be bounded by the first bounding volume and/or to only be partially bounded by the first bounding volume.

The second bounding volume can take any suitable and desired form. The second bounding volume is in an embodiment representative of the first bounding volume. In an embodiment, the second bounding volume has a form that is relatively simple when compared with the form of the first bounding volume. For example, the second bounding volume may be a simplified version of the first bounding volume. This then means that the position intersected by the vector on the second bounding volume is in an embodiment analytically determinable in a relatively simple and efficient manner, e.g. when compared with the processing that would otherwise be required to analytically determine the position intersected by the vector on the (relatively more complex) first bounding volume.

In an embodiment, the second bounding volume has the form of a box (a cube) or a sphere. Other arrangements for the second bounding volume would, of course, be possible.

The vector for which the intersection position is determined in the technology described herein may comprise any suitable such vector for which it is desired to determine an intersection position with respect to the first bounding volume. The vector should be (and in an embodiment is) defined by a direction, optionally together with a magnitude (length) (which may correspond to unity), a starting point (origin) and/or an end point. The starting point (origin) of the vector should be (and in an embodiment is) within the first (and second) bounding volume.

As will be described in more detail below, the vector is in an embodiment associated with a sampling point on or within the first bounding volume for which it is desired to determine a property (e.g. colour, transparency, etc.) in the rendering process (e.g. by sampling a graphics texture that represents the surface of the first bounding volume using a sampling vector determined from the intersection position for the first bounding volume and the vector). In these embodiments, the vector in an embodiment starts (or ends) at the sampling point.

As will be described in more detail below, although it is possible that the intersection position for the first bounding volume and the vector that is determined in the technology described herein will be (precisely) equivalent to the position on the first bounding volume intersected by the vector, it will more generally be the case that the intersection position for the first bounding volume and the vector that is determined in the technology described herein will be an approximation to the position on the first bounding volume intersected by the vector.

In contrast, the position on the second bounding volume intersected by the vector is in an embodiment analytically determined, e.g. using information defining the vector and the second bounding volume, although it would also be possible to determine an approximation to the position on the second bounding volume intersected by the vector, if desired.

The position on the second bounding volume intersected by the vector can be determined in any suitable and desired manner. In an embodiment, this is done in world space.

The determined intersection position on the second bounding volume (that is used in the later stages of the process of the technology described herein, e.g. in determining the intersection position for the first bounding volume and the vector) may take the form of a set of coordinates (in world space). However, in an embodiment, the intersection position on the second bounding volume takes the form of (is represented as) (or is used to derive) a direction from a reference position for the second bounding volume (e.g. that the second bounding volume is defined with respect to), e.g., a unit vector and/or a pair of spherical coordinates, etc.

In these embodiments, the reference position for the second bounding volume is in an embodiment within the second bounding volume, i.e. such that each direction from the reference position uniquely defines a position on the surface of the second bounding volume. The reference position for the second bounding volume (that the second bounding volume is defined with respect to) is in an embodiment at the centre of the second bounding volume, although other arrangements would be possible.

These processes of determining the position on the second bounding volume intersected by the vector can be carried out by any desired and suitable stage or component of the graphics processing unit. In an embodiment, the position on the second bounding volume intersected by the vector is determined by a fragment shading stage of the graphics processing unit, in an embodiment by that stage executing an appropriate fragment shading program (fragment shader) that can calculate the intersection point.

Other arrangements, such as this determination being done by a vertex shading stage of the graphics processing unit would also be possible, if desired.

As discussed above, in the technology described herein, the determined position on the second bounding volume intersected by the vector is used to determine information indicative of an intersection position for the first bounding volume and the vector. This may be done in any suitable and desired manner.

In an embodiment, the position on the second bounding volume intersected by the vector is used together with the direction of the vector to determine the information. As will be appreciated by those having skill in the art, the position on the first bounding volume intersected by the vector will be uniquely defined by these two pieces of information.

In these embodiments, the direction of the vector may take the form of (and/or may be used to derive) a unit vector and/or pair of spherical coordinates, etc.

In an embodiment, the position on the second bounding volume intersected by the vector is used (in an embodiment together with the direction of the vector) to look up information indicative of an intersection position for the first bounding volume and the vector, in an embodiment from pre-determined information. As will be appreciated by those having skill in the art, looking up this information represents a particularly convenient and efficient technique for determining the information indicative of the intersection position for the first bounding volume and the vector, e.g. when compared with calculating this information in real-time (at run time).

Thus, in an embodiment, using the determined position to determine information indicative of the intersection position for the first bounding volume and the vector comprises using the determined position together with the direction of the vector to look up information indicative of an intersection position for the first bounding volume and the vector from pre-determined information.

In these embodiments, the pre-determined information in an embodiment comprises information indicative of a position on the first bounding volume intersected by the vector for each of plural, in an embodiment selected, possible combinations of the position on the second bounding volume intersected by a vector and the direction of the vector.

The pre-determined information in an embodiment comprises information indicative of a position on the first bounding volume intersected by the vector for less than all possible combinations of the position on the second bounding volume intersected by a vector and the direction of the vector, and so the intersection position for the first bounding volume and the vector that is determined in the technology described herein will only be (precisely) equivalent to the position on the first bounding volume intersected by the vector in a limited number of cases, and will more generally be an approximation to the position on the first bounding volume intersected by the vector.

In one embodiment, the information indicative of an intersection position for the first bounding volume and the vector comprises position information, e.g. the (coordinates of the) intersection position for the first bounding volume and the vector. Correspondingly, according to an embodiment, the pre-determined information comprises position information, e.g. comprising the (coordinates of the) position on the first bounding volume intersected by a vector for each of plural, in an embodiment selected, combinations of the position on the second bounding volume intersected by a vector and the direction of the vector.

Thus, according to an embodiment, using the determined position to determine information indicative of an intersection position for the first bounding volume and the vector, and using the determined information to determine an intersection position for the vector with the first bounding volume comprises:

using the determined position (in an embodiment together with the direction of the vector) to determine (to look up) an intersection position for the vector with the first bounding from the pre-determined information.

In an embodiment the coordinates of the intersection position are looked up. In this case, the pre-determined information will indicate the intersection position for the vector with the first bounding volume directly (i.e. in itself).

In another embodiment, the information indicative of an intersection position for the first bounding volume and the vector is information that does not directly indicate the intersection position in itself (on its own) but rather is information that can be (and that is to be) used, e.g. and in an embodiment with other information, to derive and/or determine an intersection position for the first bounding volume and the vector.

In this case, the information indicative of an intersection position for the first bounding volume and the vector may comprise any suitable and desired information that can be used to determine an intersection position for the first bounding volume and the vector. In a particularly such embodiment, the information comprises distance information indicative of the distance from the determined position intersected on the second bounding volume by the vector to an intersection position for the first bounding volume and the vector.

Thus, according to an embodiment, the pre-determined information comprises distance information, e.g. that is indicative of the distance from the position on the second bounding volume interested by a vector to a position on the first bounding volume intersected by the vector for each of plural, in an embodiment selected, combinations of the position on the second bounding volume intersected by a vector and the direction of the vector.

In these embodiments, the intersection position for the vector with the first bounding volume is in an embodiment determined using the distance information. Thus, according to an embodiment, using the determined position to determine information indicative of an intersection position for the first bounding volume and the vector, and using the determined information to determine an intersection position for the vector with the first bounding volume comprises:

using the determined position to determine a distance value indicative of the distance from the determined position intersected on the second bounding volume by the vector to an intersection position for the first bounding volume and the vector; and using the determined distance value to determine an intersection position for the vector with the first bounding volume.

In these embodiments, the determined distance value may be used to determine the intersection position for the first bounding volume and the vector in any suitable and desired manner.

In an embodiment, the distance value is used together with the direction of the vector and the position on the second bounding volume intersected by the vector to determine the intersection position for the first bounding volume and the vector. In an embodiment, a distance vector is generated using the distance value together with the direction of the vector, e.g. by multiplying the (normalized, unit) vector by the distance value. This distance vector is in an embodiment then applied to (i.e. added to or subtracted from) the position on the second bounding volume intersected by the vector to determine the intersection position for the first bounding volume and the vector.

Other arrangements would, of course, be possible.

It would also be possible for the pre-determined information to comprise at least some information that is other than (i.e. not) indicative of an intersection position. For example, where there is no intersection for a particular combination of the position on the second bounding volume intersected by a vector and the direction of the vector, and/or where the first bounding volume comprises a volume having one or more holes that are used e.g. to represent windows in the environment (e.g. room) of the scene being rendered (as discussed above), the corresponding values of the pre-determined information (that would be looked up using the position on the second bounding volume intersected by the vector and the direction of the vector) may comprise one or more particular, in an embodiment selected, in an embodiment predetermined, "special", values, such as positive infinity when using floating point values, that are predefined as indicating that the vector will not intersect with the first volume at that position. In this case, where such a "special" value is returned (looked up), then rather than determining an intersection position in the manner of the embodiments, a particular, in an embodiment selected, in an embodiment predefined operation, such as applying a default colour, is in an embodiment performed instead.

The pre-determined information may take any suitable and desired form. In one embodiment, the pre-determined information comprises an array of pre-determined values, where at least some values (and in an embodiment each pre-determined value) in the array in an embodiment comprises a (e.g. position or distance) value indicative of the position on the first bounding volume intersected by a vector for a particular combination of the position on the second bounding volume intersected by the vector and the direction of the vector.

Each value may be, for example, in the form of a floating point number, and may have a certain precision such as a 16-bit precision, etc. Other arrangements would, of course, be possible.

The array of pre-determined values can be a 2D array, a 3D array or a 4D array, etc. For example, where the scene is a 3D scene, such that the position on the second bounding volume intersected by a vector and the direction of the vector can each be defined by a 2D direction (e.g. a pair of spherical coordinates), the array in an embodiment comprises a 4D array. Where the scene is a 2D scene, such that the position on the second bounding volume intersected by the vector and the direction of the vector can each be defined by a 1D direction (e.g. an angle), the array in an embodiment comprises a 2D array.

It would also be possible, where the scene is a 3D scene, for the array to comprise a 3D array. In this case, the 4D information could be, for example, "flattened" into a 3D array. Thus, in an embodiment, the pre-determined information comprises a 3D array of 4D pre-determined information. This would then allow the array to be processed with "standard" 3D techniques (as will be described further below).

The array of pre-determined values can have any suitable and desired resolution. As will be appreciated by those having skill in the art, using a higher resolution array will result in more accurate results, but at the expense of requiring more resources (and vice versa). A 4D array could have a resolution of, for example, 32×32×16×16 data elements, e.g. corresponding to 32×32 possible intersection positions on the second bounding volume and 16×16 possible vector directions. A corresponding 3D flattened array would have a resolution of 32×32×256 data elements. Other resolutions would, of course, be possible.

In one embodiment, the pre-determined information takes the form of a graphics texture, and the information indicative of the intersection position for the first bounding volume and the vector is looked up by sampling the graphics texture. In these embodiments, the texture is in an embodiment sampled using the position intersected by the vector on the second bounding volume and the direction of the vector. For example, where the position intersected by the vector on the second bounding volume and the direction of the vector are represented by respective pairs of spherical coordinates, these spherical coordinates are in an embodiment used to sample the texture.

The texture can be sampled in any desired and suitable manner. For example, appropriate filtering (interpolation) processes, such as bilinear filtering, can be used when sampling the texture, if desired. Where the texture comprises a 2D, 3D or 4D texture, the texture may be sampled by performing a 2D, 3D or 4D texture look up operation as appropriate. Where the texture comprises a 3D flattened 4D texture, the texture may be sampled by performing two 3D texture look up operations, and appropriately interpolating between the two results. This latter technique is particularly useful in arrangements where, for example, 4D texture look ups are not supported.

Other arrangements would, of course, be possible.

These processes for determining an intersection position for the first bounding volume and the vector can again be carried out by any desired and suitable stage or component of the graphics processing unit. In an embodiment they are performed by a fragment shading stage (a fragment shader) of the graphics processing unit, in an embodiment by executing an appropriate fragment shading program. They may also or instead be performed at least in part by an appropriate texture mapping stage of the graphics processing unit, if desired.

Other arrangements, such as this determination being done by a vertex shading stage of the graphics processing unit would also be possible, if desired.

As will be appreciated from the above, in an embodiment of the technology described herein, there will be a set of intersection position indicating information associated with the second bounding volume, and the determined intersection position on the second bounding volume and the intersection position indicating information associated with the second bounding volume will be used to determine an intersection position for the first bounding volume and the vector.

In these embodiments, the pre-determined information (texture) is in an embodiment generated in advance of its requirement, e.g. "offline" (rather than being generated in "real-time" (at run-time) as and when it is needed), and in an embodiment stored in memory.

In an embodiment, the pre-determined information (texture) is compressed before it is stored. This can accordingly reduce storage and bandwidth requirements. Any suitable (texture) compression process can be used for this. For example, where the pre-determined information comprises a 3D texture, "standard" 3D texture compression techniques, such as the Adaptive Scalable Texture Compression (ASTC) scheme (e.g. as described in GB 2491687), can be used. Since generally only an approximate intersection position is determined, relatively heavy compression can be used for the texture.

The generated pre-determined information (texture) may be stored, e.g. on an appropriate portable storage medium, such as a DVD, or in memory, for future use by a graphics processing unit, when it is desired to use the pre-determined information (texture) when rendering, e.g., an image.

The technology described herein also extends to the generation of textures indicative of the position on a first bounding volume intersected by a vector for plural combinations of the position on a second bounding volume intersected by the vector and the direction of the vector. It may be, for example, that the texture(s) would be generated (and stored) separately, and/or in advance, and then, e.g., provided to a graphics processor for use. The technology described herein extends to these activities, as well as to the use of the textures for determining the position on a volume intersected by a vector.

Thus, another embodiment of the technology described herein comprises a method of generating a texture for use in a graphics processing system when rendering a scene for output in which a first bounding volume representative of the volume of all or part of the scene to be rendered is defined, the method comprising:

generating a graphics texture comprising an array of texture texels by:

setting the texel values in the texture such that each texel stores a value indicative of an intersection position on the first bounding volume for a vector for a particular combination of the position on a second bounding volume associated with the first bounding volume intersected by the vector and the direction of the vector; and storing data representing the texel values of the texture.

Another embodiment of the technology described herein comprises an apparatus for generating a texture for use in a graphics processing system when rendering a scene for output, in which a first bounding volume representative of the volume of all or part of the scene to be rendered is defined, the apparatus comprising processing circuitry configured to:

generate a graphics texture comprising an array of texture texels by:

setting the texel values in the texture such that each texel stores a value indicative of an intersection position on the first bounding volume for a vector for a particular combination of the position on a second bounding volume associated with the first bounding volume intersected by the vector and the direction of the vector; and storing data representing the texel values of the texture.

Another embodiment of the technology described herein comprises a texture for use in a graphics processing system when rendering a scene for output, in which a first bounding volume representative of the volume of all or part of the scene to be rendered is defined, the texture comprising:

an array of texture texels, in which:

the texel values are set such that each texel stores a value indicative of an intersection position on the first bounding volume for a vector for a particular combination of the position on a second bounding volume associated with the first bounding volume intersected by the vector and the direction of the vector.

As will be appreciated by those skilled in the art, these embodiments of the technology described herein can, and in an embodiment do, include any one or more or all of the optional features of the technology described herein, as appropriate.

Thus for example, the first bounding volume in an embodiment comprises a convex volume. The second bounding volume in an embodiment bounds and/or is bounded by the first bounding volume, and in an embodiment has a form that is relatively simple compared to the form of the first bounding volume. Each stored value indicative of an intersection position on the first bounding volume in an embodiment comprises a position value or a distance value, e.g. and in an embodiment as described above.

In an embodiment, as well as generating the texture, the "second" bounding volume that the texture is to be used with is also generated and stored. In an embodiment data defining the second bounding volumes is generated and stored in association with (associated with) the texture. Again, this bounding volume information can be subject to any desired post-processing operations, such as compression, if desired.

Once it has been determined, the intersection position for the first bounding volume and the vector can be used as desired.

It would be possible for the intersection position to be output as the "final" result of the processing operation. However, in an embodiment, the intersection position is used in further processing operation(s).

In one embodiment, the techniques of the technology described herein are used in environment mapping. In these techniques (and in an embodiment of the technology described herein), for at least one sampling point on or within a bounding volume that represents the volume of all or part of the scene to be rendered (i.e. the first bounding volume), one or more properties are determined for use in representing the scene at that sampling point. The one or more properties are in an embodiment determined by using the intersection position for the (first) bounding volume and a vector from the sampling point to determine a sampling vector to be used to sample a graphics texture that represents the surface of the (first) bounding volume, and then sampling the graphics texture using the sampling vector.

Thus, according to an embodiment the intersection position for the first bounding volume and the vector is used to determine a vector to be used to sample a graphics texture that represents the surface of the first bounding volume in the scene, and the determined vector is in an embodiment (then) used to sample the graphics texture to determine a property to be used to represent the scene at the sampling point.

The one or more determined properties are in an embodiment one or more properties of the scene (environment) that affect the sampling point, e.g. due to reflection, shadow and/or refraction, etc. The properties may comprise, for example, one or more colour and/or transparency values. Thus, in various embodiments, the techniques of the technology described herein may be used in reflection mapping, and/or other environment mapping techniques such as the Applicant's shadow mapping techniques described in GB 1413145.2, and/or the Applicant's refraction mapping techniques described in GB 1503391.3 and GB 1503386.3.

In the reflection mapping technique for example (and in an embodiment), for at least one sampling point on a reflective surface in the scene, a reflected vector is determined using the vector from the viewpoint (camera) position for the scene to the sampling point, in an embodiment together with the normal of the reflective surface at the sampling point, e.g. based on the law of reflection. The intersection of the reflected vector on a bounding volume representative of the volume of all or part of the scene (i.e. the first bounding volume) is then determined, and the intersection position is used to determine a vector to be used to sample a graphics texture that represents the colour of the bounding volume in the scene. The graphics texture is (then) sampled using the determined vector to determine a colour value indicative of the surface of the bounding volume as reflected at the sampling point and seen from the viewpoint (camera) position. Thus, according to an embodiment the vector for which the intersection position for the first bounding volume is determined comprises a reflected vector (in an embodiment determined as described above), and the intersection position for the first bounding volume and the reflected vector is used to determine a sampling vector to be used to sample a graphics texture that represents the colour of the bounding volume in the scene. The determined sampling vector is in an embodiment (then) used to sample the graphics texture to determine a colour to be used to represent the part of the scene that will be reflected from and visible at the sampling point in question.

The techniques of the technology described herein may also be used to detect collisions, e.g. between particles and an environment, e.g. for in-game effects.

Thus, according to another embodiment the vector for which the intersection position for the first bounding volume is determined comprises a velocity vector for a particle, and the intersection position for the first bounding volume and the velocity vector is used to determine whether the particle will collide with the environment, e.g. within a given time period.

It is believed that the idea of using the techniques of the technology described herein in environment mapping is new and advantageous in its own right.

Thus, a further embodiment of the technology described herein comprises a method of operating a graphics processing system when rendering a scene for output, in which a first bounding volume representative of the volume of all or part of the scene to be rendered is defined; the method comprising:

for at least one sampling point on or within the first bounding volume, determining a property to be used to represent the scene at that sampling point by:

determining an intersection position for a vector from the sampling point with the first bounding volume by:

determining the position intersected by the vector on a second bounding volume associated with the first bounding volume;

using the determined position to determine information indicative of an intersection position for the first bounding volume and the vector; and using the determined information to determine an intersection position for the vector with first bounding volume;

using the determined intersection position for the first bounding volume and the vector to determine a sampling vector to be used to sample a graphics texture that represents the surface of the first bounding volume; and using the determined sampling vector to sample the graphics texture to determine a property to be used to represent the scene at the sampling point.

An embodiment of the technology described herein comprises a graphics processing unit comprising:

processing circuitry configured to, when rendering a scene for output for which a first bounding volume representative of the volume of all or part of the scene to be rendered is defined:

for at least one sampling point on or within the first bounding volume, determine a property to be used to represent the scene at that sampling point by:

determining an intersection position for a vector from the sampling point with the first bounding volume by:

determining the position intersected by the vector on a second bounding volume associated with the first bounding volume;

using the determined position to determine the information indicative of an intersection position for the first bounding volume and the vector; and using the determined information to determine an intersection position for the vector with the first bounding volume;

using the determined intersection position for the first bounding volume and the vector to determine a sampling vector to be used to sample a graphics texture that represents the surface of the first bounding volume; and using the determined sampling vector to sample the graphics texture to determine a property to be used to represent the scene at the sampling point.

As will be appreciated by those having skill in the art, these embodiments of the technology described herein can, and in an embodiment do, include any one or more or all of the optional features of the technology described herein, as appropriate.

Thus, for example, the second bounding volume is in an embodiment as described above, e.g. the second bounding volume in an embodiment bounds and/or is bounded by the first bounding volume, and in an embodiment has a form that is relatively simple compared to the form of the first bounding volume. The information indicative of an intersection position for the first bounding volume and the vector is in an embodiment determined by using the determined position to look up the information from pre-determined information, e.g. and in an embodiment as described above.

The determined property may comprise a colour, and/or transparency value, etc.

The first bounding volume is in an embodiment as described above, e.g. the first bounding volume in an embodiment comprises a convex volume, and may be e.g. relatively complex.

In these embodiments, the graphics texture that represents the surface of the first bounding volume can take any suitable and desired form. In an embodiment it is in the form of a texture that is used for environment mapping, such as a cube texture (cube map) or a sphere texture (sphere map). The texture is in an embodiment configured to correspond to the first bounding volume for the scene.

Thus, in an embodiment, the texture that represents the surface of the first bounding volume comprises a texture that indicates and stores for points on a surface that surrounds a reference position within the volume that the texture encompasses, one or more properties (e.g. colour and/or transparency values) for each point. The texture is in an embodiment sampled based on a sampling vector (direction) from the reference position for the texture (that the texture is defined with respect to).

In other words, the texture in an embodiment stores one or more properties (e.g. colour and/or transparency values) for respective directions from a reference position (point) within the volume that the texture represents, and is sampled by determining a direction from the reference position (point) within the texture to a position on the surface that the texture represents.

The reference position (point) within the texture that the texture is defined (and sampled) with respect to is in an embodiment at the centre of the volume that the texture encompasses, but other arrangements would, of course, be possible, if desired.

The texture in an embodiment has a resolution that will be suitable for the anticipated size of the first bounding volume that it is to be used with (although this is not essential, and the texture could, e.g., be scaled for use, if required).

The texture could be a single channel texture, storing a single property (e.g. colour or transparency (alpha) channel) only. Alternatively, the texture could store plural properties (plural data channels), such as plural colour and/or transparency channels. In an embodiment, the texture is an RGB or RGBα texture.

The texture is in an embodiment generated by rendering an image of a surface for the first bounding volume from the viewpoint of the reference position for the texture (from the texture reference position). The generated texture may be stored, e.g. on an appropriate portable storage medium, such as a DVD, or in memory, for future use by a graphics processing unit, when it is desired to use the texture when rendering, e.g., an image.

In an embodiment, the texture is stored (encoded) as a set of mipmaps (i.e. where multiple versions of the original texture each having different levels of detail (resolution) are stored for use).

The texture is in an embodiment generated in advance of its requirement, e.g. "offline" (rather than being generated in "real-time" as and when it is needed).

In an embodiment, the texture is subject to one or more processing operations after it has been generated (and before it is stored for use), such as, and in an embodiment, one or more filtering processes, such as having one or more convolution filters applied to it. In an embodiment the texture is subjected to one or more of: blurring; brightness processing; contrast processing (e.g. enhancement); sharpening, etc. In an embodiment, the texture is subjected to one or more non-real-time optimisations.

In an embodiment, the texture is also compressed before it is stored. Any suitable texture compression process can be used for this.

As discussed above, the texture is in an embodiment generated by rendering an image that will represent the surface of the first bounding volume from the viewpoint of the reference position for the texture. This is in an embodiment done by sampling respective positions on the surface (the image representing the surface) for respective positions on the first bounding volume (in the relevant direction from the reference position for the texture). In this process, although the first bounding volume may be a relatively accurate approximation of the actual scene (e.g. room) being defined, the first bounding volume may not match exactly to the surface of the scene (e.g. room) being defined (e.g. where the, e.g. walls of the room may be uneven or have surface roughness). To allow for this when generating the texture, the points of the surface that are sampled for the texture (for each texel), can be, and are in an embodiment, allowed to, fall on, outside of or inside the first bounding volume (rather than the sampling points being constrained to be on the walls of the bounding volume). This will avoid holes being introduced within the texture where the first bounding volume does not match exactly with the scene geometry. The surface is in an embodiment sampled at a position as close to the corresponding position on the first bounding volume (in the relevant direction from the reference position for the texture) as possible, as the further a sampling point is from the first bounding volume, the greater the error that will be introduced when using the texture, particularly when making a local correction (as described above). Accordingly, the first bounding volume is in an embodiment defined such that it matches the scene (the surface defining the scene) closely (in an embodiment as closely as possible), such that the texture can be generated using samples near to (as near as possible to) the walls of the first bounding volume.

In an embodiment, as well as generating the texture, the first bounding volume that the texture represents (is to be used with) is also generated and stored. In an embodiment data defining the first bounding volume is generated and stored in association with (associated with) the texture. Again, this bounding volume information can be subject to any desired post-processing operations, such as compression, if desired.

In an embodiment, a graphics texture is generated and stored, in an embodiment together with an associated "first" bounding volume", e.g. for each scene that is anticipated may be displayed when executing the application, e.g. game, that the texture and scene relate to. Correspondingly, an array of pre-determined intersection position-indicating information (texture) is in an embodiment generated and stored, in an embodiment together with an associated "second" bounding volume, e.g. for each scene. In an embodiment, plural graphics textures are generated and stored, e.g. for respective scenes that is anticipated may be displayed when executing the application, e.g. game, that the textures and scenes relate to. Correspondingly, plural arrays of pre-determined intersection position-indicating information (textures) are in an embodiment generated and stored, e.g. for the respective scenes.

For example, where a game will include plural scenes, such as rooms, in an embodiment respective pairs of pre-determined intersection position-indicating textures and property-indicating textures (cubemaps) are generated for each scene (e.g. room) that could fall to be displayed when the game is played. The textures can then be stored, e.g., with the remaining game data for use when the game is being executed.

Any or all of the above processes could be performed for sampling points individually, or some or all of them could be performed for sets of plural sampling points (which would then have the effect of performing the process for the sampling points within the set that is being considered). For example, where the graphics processing unit operates on fragments that each represent a set of plural sampling positions, the process of the technology described herein could be performed on a per-fragment basis, rather than individually for each sampling point that a fragment represents (and in an embodiment this is what is done). In this case, there would accordingly be, e.g., a single property determined for a fragment, which would then be used for each sampling point that the fragment is being used to render.

It will also be appreciated that although embodiments have been described above with particular reference to a given sampling point, the technique of the technology described herein can be, and in an embodiment is, used for plural sampling points, and in an embodiment for each sampling point that needs to be considered when rendering the scene.

Thus, the process is in an embodiment repeated for each sampling point for a primitive that is on or within the (first)

bounding volume that is being considered, and for each primitive that is on or within the (first) bounding volume that is being considered.

Similarly, the process is in an embodiment repeated for plural scenes in a sequence of scenes being rendered, e.g., and in an embodiment, for each frame of a sequence of frames to be rendered.

The technology described herein can be used in and with any suitable and desired graphics processing system and unit. The graphics processing unit in an embodiment comprises a graphic processing pipeline.

The technology described herein may be used with immediate mode renderers or tiled renderers (tile-based graphics processing systems). Thus, in one embodiment, the graphics processing unit is a tiled-based graphics processing unit.

The graphic processing unit in an embodiment comprise a plurality of processing stages, including at least a rasteriser that rasterises input primitives to generate graphics fragments to be processed, each graphics fragment having one or more sampling positions associated with it, and a renderer that processes fragments generated by the rasteriser to generate output fragment data.

The rasteriser of the graphics processing unit will in an embodiment generate graphics fragments to be rendered to generate rendered graphics data for sampling points of the desired graphics output, such as a frame to be displayed. Each graphics fragment that is generated by the rasteriser has associated with it a set of sampling points of the graphics output and is to be used to generate rendered graphics data for one or more of the sampling points of the set of sampling points associated with the fragment.

The rasteriser may be configured to generate the fragments for rendering in any desired and suitable manner. It will in an embodiment receive e.g. primitives to be rasterised, test those primitives against sets of sampling point positions, and generate fragments representing the primitives accordingly.

The renderer should process the fragments generated by the rasteriser to generate rendered fragment data for (covered) sampling points that the fragments represent. These rendering processes may include, for example, fragment shading, blending, texture-mapping, etc. In an embodiment the renderer is in the form of or includes a programmable fragment shader.

The graphics processing unit may also contain any other suitable and desired processing stages that a graphics processing unit may contain such as an early depth (or an early depth and stencil) tester, a late depth (or depth and stencil) tester, a blender, a tile buffer or buffers, a write-out unit, etc.

The graphics processing unit in an embodiment also comprises, and/or is in communication with, one or more memories and/or memory devices that store the data described herein, such as the textures, scene bounding volumes, etc., and/or that store software for performing the processes described herein. The graphics processing unit may also be in communication with the host microprocessor, and/or with a display for displaying images based on the data generated by the graphics processing unit.

The graphics processing unit in an embodiment includes at least local memory, such as (on-chip) buffer or buffers, and/or register(s), that can be used to store the data required for the intersection position determination process and the determined intersection position. Where present, buffers can be used for this purpose, if desired. The graphics processing unit can in an embodiment also cache determined intersection position values for future use, if desired.

The technology described herein can be used for all forms of output that a graphics processing unit may be used to generate, such as frames for display, render-to-texture outputs, etc.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the graphics processing system can otherwise include any one or more or all of the usual functional units, etc., that graphics processing systems include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor, said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Embodiments of the technology described herein will now be described in the context of the processing of computer graphics for display.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

FIG. 1 shows schematically a graphics processing pipeline 1 that may operate in accordance with the technology described herein. The graphics processing pipeline 1 is a tiled deferred renderer with a fully programmable GPGPU context, for example a renderer which executes partly via Direct Compute, OpenCL, CUDA, etc.

As the graphics processing pipeline 1 shown in FIG. 1 is a tile-based renderer, it will thus produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential. Each tile corresponds to a respective set of screen space sampling positions.)

The render output data array may typically be an output frame intended for display on a display device, such as a screen or printer, but may also, for example, comprise intermediate data intended for use in later rendering passes (also known as a "render to texture" output), etc.

FIG. 1 shows the main elements and pipeline stages of the graphics processing pipeline 1 that are relevant to the operation of the present embodiment. As will be appreciated by those skilled in the art there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

FIG. 1 shows schematically the pipeline stages after the graphics primitives (polygons) 2 for input to the rasterisation process have been generated. Thus, at this point the graphics data (the vertex data) has undergone fragment frontend operations 8, such as transformation operations (not shown), vertex shading, interpolation and a primitive set-up stage (not shown) to set-up the primitives to be rendered, in response to the commands and vertex data provided to the graphics processor.

As shown in FIG. 1, this part of the graphics processing pipeline 1 includes a number of stages, including a rasterisation stage 3, an early Z (depth) and stencil test stage 4, a renderer in the form of a fragment shading stage 6, a late Z (depth) and stencil test stage 7, a blending stage 9, a tile buffer 10 and a downsampling and writeout (multisample resolve) stage 13.

The rasterisation stage 3 of the graphics processing pipeline 1 operates to rasterise the primitives making up the render output (e.g. the image to be displayed) into individual graphics fragments for processing. To do this, the rasteriser 3 receives graphics primitives 2 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 4 performs a Z (depth) test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer that is part of the tile buffer 10) to determine whether the new fragments will be occluded by fragments that have already been rendered (or not). At the same time, an early stencil test is carried out.

Fragments that pass the fragment early Z and stencil test stage 4 are then sent to the fragment shading stage 6. The fragment shading stage 6 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by comparing the depth values of (associated with) fragments issuing from the fragment shading stage 6 with the depth values of fragments that have already been rendered (as stored in the depth buffer). This late fragment depth and stencil test stage 7 also carries out any necessary "late" alpha and/or stencil tests on the fragments.

The fragments that pass the late fragment test stage 7 are then subjected to, if required, any necessary blending operations with fragments already stored in the tile buffer 10 in the blender 9. Any other remaining operations necessary on the fragments, such as dither, etc. (not shown) are also carried out at this stage.

Finally, the (blended) output fragment data (values) are written to the tile buffer 10 from where they can, for example, be output to a frame buffer for display. The depth value for an output fragment is also written appropriately to a Z-buffer within the tile buffer 10. (The tile buffer stores colour and depth buffers that store appropriate colour, etc., values or a Z-value, respectively, for each sampling position that the buffers represent (in essence for each sampling position of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 10 is input to a downsampling (multisample resolve) write out unit 13, and thence output (written back) to an external memory output buffer, such as a frame buffer of a display device (not shown). (The display device could comprise, e.g., a display comprising an array of pixels, such as a computer monitor or a printer.)

In the present embodiments, the downsampling and writeout unit 13 downsamples (in either a fixed or variable fashion) the fragment data stored in the tile buffer 10 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 1 would, of course, be possible.

The above describes certain features of the operation of the graphics processing system shown in FIG. 1. Further features of the operation of the graphics processing system shown in FIG. 1 that allow the effect of reflections in an image being rendered to be simulated in accordance with embodiments of the technology described herein will now be described.

Figure 2:
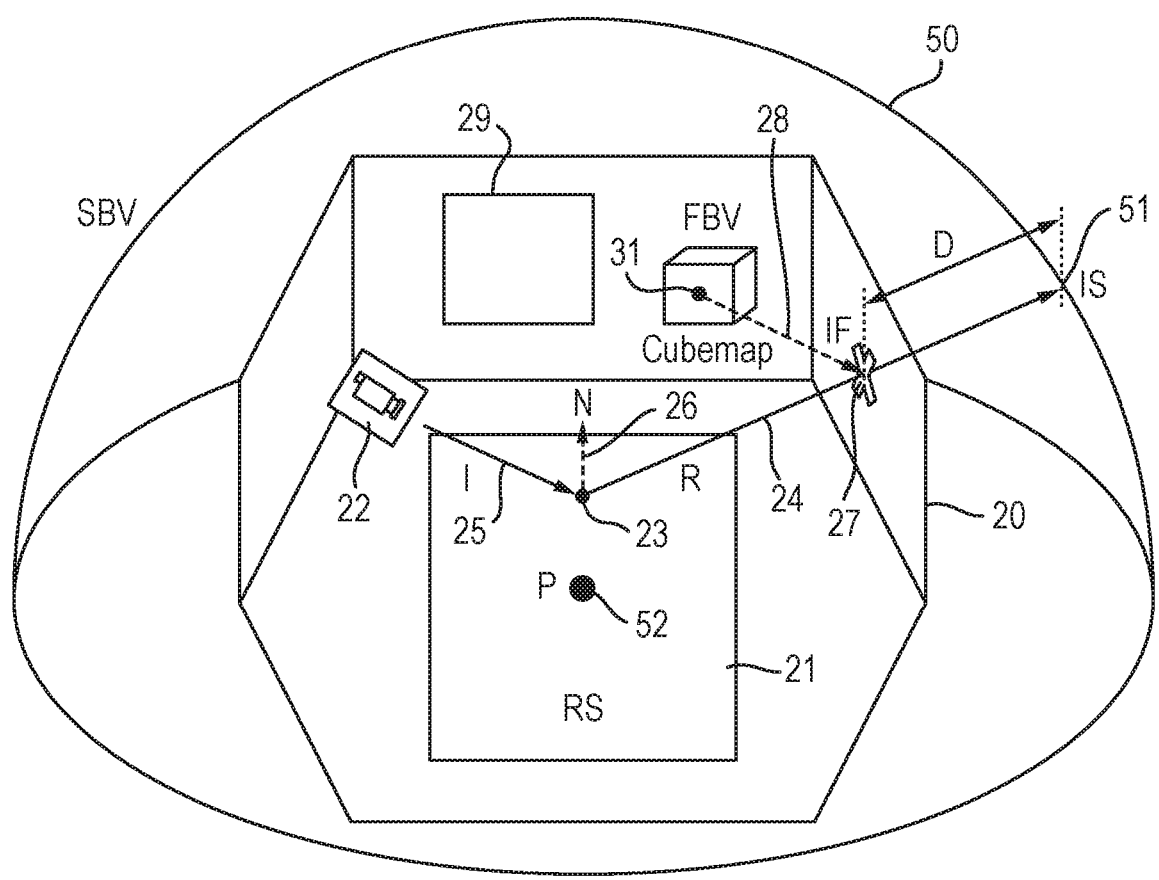
FIG. 2 shows schematically the operation of an embodiment of the technology described herein.

The present embodiments operate to simulate the effect of reflections within a defined volume for a scene. FIG. 2 illustrates this and shows an exemplary "first" bounding volume 20 in the form of a bounding box that is defined in world space, that represents a volume within the scene being rendered. In the present embodiment it is assumed that the bounding volume 20 corresponds to the entire scene and represents e.g., a room, but other arrangements would, of course, be possible. As shown in FIG. 2, it is also assumed that a reflective surface 21 is present in the scene.

The first bounding volume 20 should be a convex bounding volume, i.e. such that for any two points within the bounding volume, every point on the straight line segment that joins the two points is also within the first bounding volume. However, it would also be possible for the first bounding volume to comprise a shape that is not "strictly" convex in this sense. For example, the first bounding volume could comprise a substantially convex volume having one or more holes 29, which could be used to represent windows in the environment (e.g. room) of the scene being rendered.

In the present embodiment, a "second" bounding volume 50 that bounds the first bounding volume 20 is defined in world space. The second bounding volume 50 is effectively a simplified version of the first bounding volume 20. In FIG. 2, the second bounding volume 50 takes the form of a bounding sphere, but other arrangements, such as a bounding box, would be possible. In general, any volume where the intersection point of a vector on the volume can be analytically calculated in a relatively simple manner may be used.

A distance-indicating texture is generated that stores distance values representing the distance from the surface of the first bounding volume 20 to the surface of the second bounding volume 50 with respect to various points on the second bounding volume 50 and in various directions. In the present embodiment, each distance value in the texture comprises the distance D from the position on the second bounding volume 50 intersected by a vector to the position on the first bounding volume 20 intersected by the vector for a given combination of the position on the second bounding volume 50 intersected by the vector and the direction of the vector, although other arrangements would be possible.

In the present embodiment, each distance value in the distance texture is in the form of a floating point number, and has a certain precision such as a 16-bit precision, etc., although other arrangements would be possible.

As can be seen from FIG. 2, where the scene to be rendered is a 3D scene, the position on the second bounding volume 50 intersected by a vector and the direction of the vector can each be defined by a 2D direction (e.g. a pair of spherical coordinates), and so the texture may comprise a 4D texture. Where the scene is a 2D scene, such that the position on the second bounding volume intersected by the vector and the direction of the vector can each be defined by a 1D direction (e.g. an angle), the texture may comprise a 2D texture.

It would also be possible, where the scene is a 3D scene, for the texture to comprise a 3D texture. In this case, a 4D texture having a resolution of, for example, 32×32×16×16 data elements, e.g. corresponding to 32×32 possible intersection positions on the second bounding volume and 16×16 possible vector directions, could be "flattened" into a 3D texture having a resolution of 32×32×256 data elements.

Figure 3:
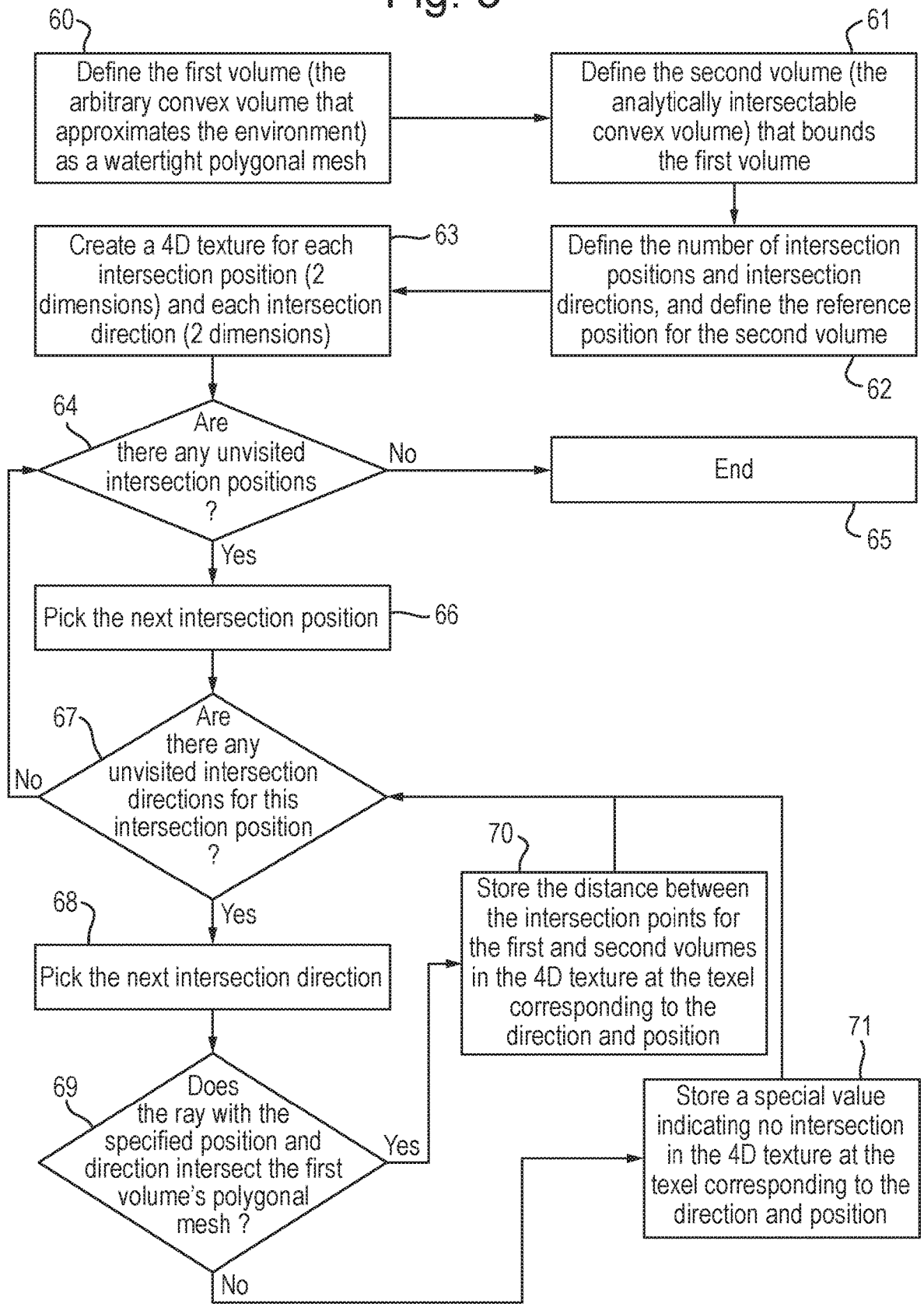
FIG. 3 shows schematically the generation of a texture in an embodiment of the technology described herein.

FIG. 3 shows schematically the generation of the distance-indicating texture. In the present embodiment, the distance-indicating texture is generated by firstly defining the first bounding volume 20 as a "watertight" polygonal mesh (step 60), defining the second bounding volume 50 that bounds the first bounding volume 20 (step 61), defining the resolution of the texture (e.g. 32×32×16×16), and defining how the texture maps to the second bounding volume 50 (i.e. defining the reference position for the second bounding volume 50 and how each position on the second bounding volume corresponds to each spherical coordinate, etc.) (step 62). Then, a 4D texture is created (step 63), and for each of the (32×32) possible intersection positions on the second bounding volume 50, for each of the (16×16) possible vector directions, a ray is intersected with the first bounding volume 20, and (where possible) a distance value is calculated. As the first bounding volume 20 is defined as a watertight polygonal mesh, this intersection may be done by iterating through each polygon in the mesh and performing a ray-polygon intersection calculation. Thus, as shown in FIG. 3, the process involves iteratively determining, for each intersection position and for each direction, whether a ray intersects with the polygonal mesh (steps 64-69).

Each calculated distance value is then stored in a 4D texture, at the texel corresponding to the intersection position on the second bounding volume 50 and the vector direction in question (step 70). If, for a particular intersection position and vector direction, there is no intersection with the first bounding volume 20 (e.g. where the first and second bounding volumes are non-identical), a "special" value is stored in the texture that indicates there is no intersection (step 71). For a floating point texture, this could be, for example, positive infinity. It would also be possible, rather than store a special value, to store the distance value from the closest texel where an intersection does occur.

Once the distance texture has been generated, it may optionally be subjected to compression. Any suitable texture compression scheme can be used to compress the distance texture. Where the texture is a 3D texture, "standard" 3D texture compression schemes, such as the Adaptive Scalable Texture Compression (ASTC) scheme, can be used. Since in the present embodiment only an approximate intersection point is determined, relatively heavy compression may be used, reducing the storage and bandwidth requirements.

The distance texture generation and any compression of the distance texture can be performed as desired and using any suitable processing system. In an embodiment the distance texture is generated "offline" and stored, and then provided to the graphics processing pipeline for use when it is required.

Figure 4:
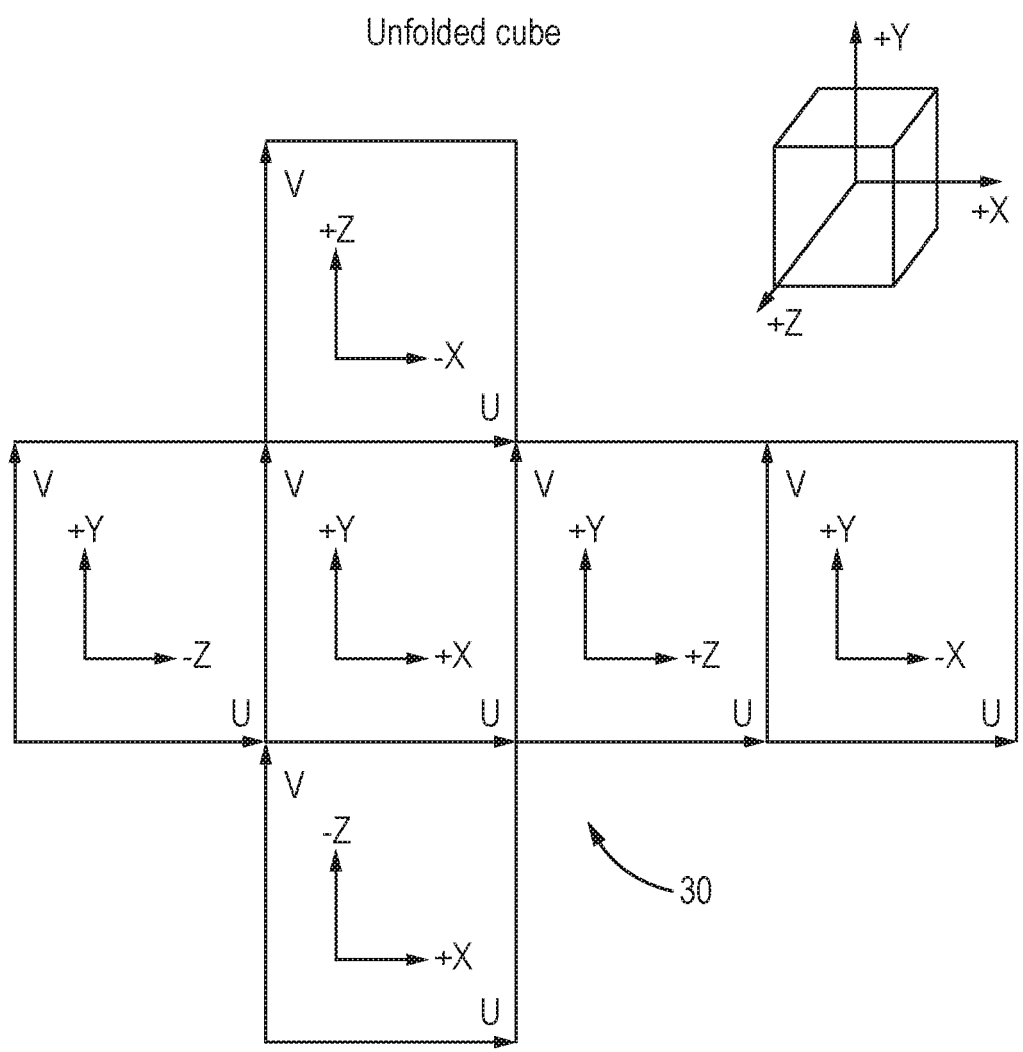
FIG. 4 shows an exemplary texture used in an embodiment of the technology described herein.

In the present embodiment a cube texture corresponding to the surface of the bounding volume 20 that stores colour (RGB) values representing the colour of the surface of the bounding volume 20 is also generated. FIG. 4 shows the corresponding cube texture 30 for the bounding volume 20 shown in FIG. 2. The cube texture 30 will store colour values for the bounding volume surface.

Figure 5:
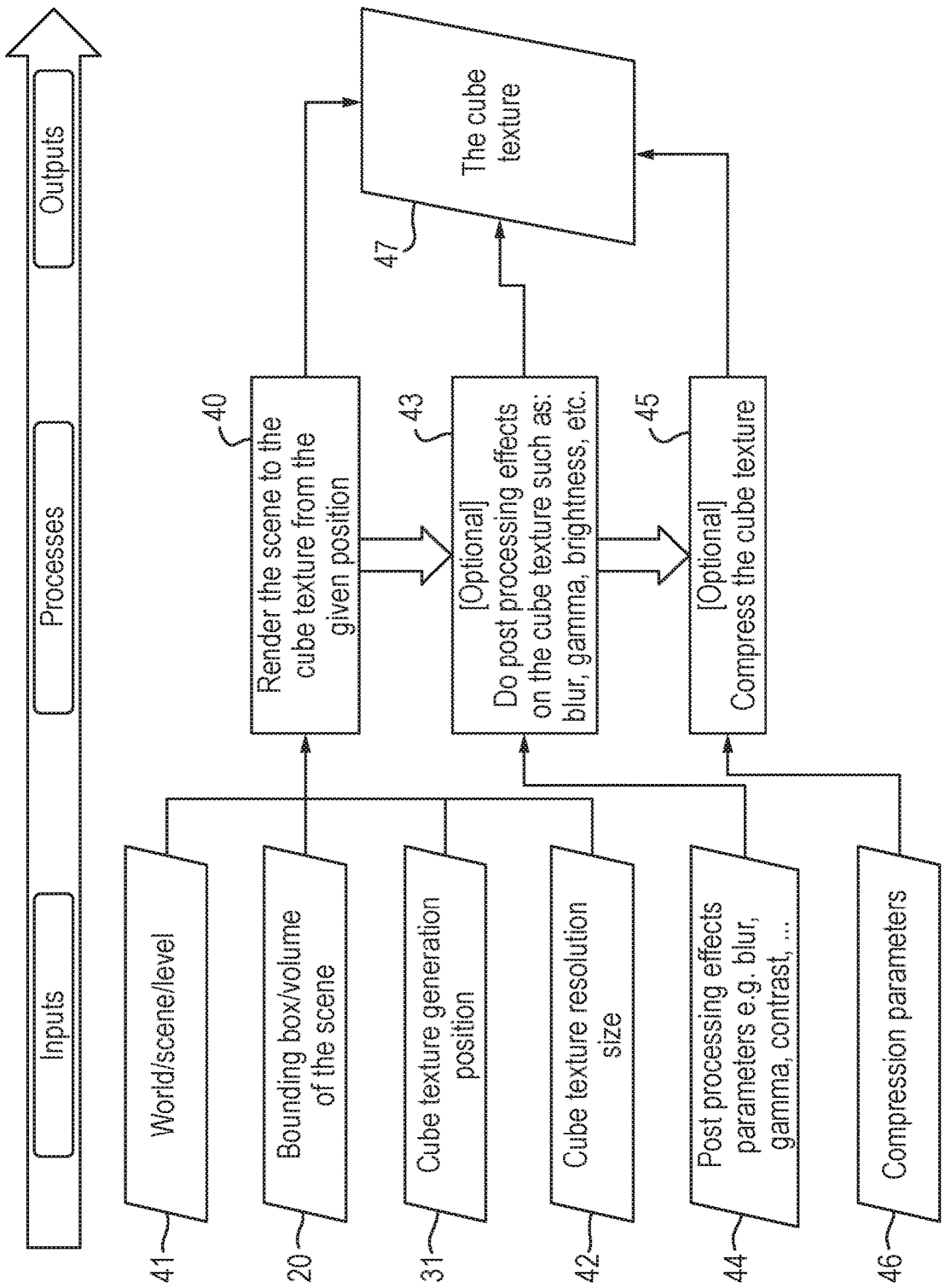
FIG. 5 shows schematically the generation of a texture in an embodiment of the technology described herein.

FIG. 5 shows schematically the generation of the cube texture shown in FIG. 4. As shown in FIG. 5, the process starts by rendering the scene to the cube texture from the reference position 31 (shown in FIG. 2) that the cube texture is to be defined with respect to (step 40). (The cube texture 30 will be defined with respect to a reference position 31 (shown in FIG. 2) within the volume that the cube texture represents (thus the bounding volume for the scene), and will be sampled by determining the direction from that reference position that the sampled value (the sampled position) is required for.)

This process uses as its inputs information about the scene 41, information defining the first bounding volume 20, information defining the reference position 31 for the cube texture, and information indicating the resolution size 42 that is desired for the cube texture.

The cube texture 30 is generated by rendering an image that will represent the surface of the first bounding volume 20 from the viewpoint of the reference position 31 for the texture. To do this respective positions on the surface (the image representing the surface) for the scene (as defined by the scene information 41) are sampled for respective positions on the first bounding volume (in the relevant direction from the reference position 31 for the texture). In this process, as the first bounding volume may be an approximation of the actual scene and so may not match exactly to the surface of the scene (e.g. room) being defined, the points of the surface that are sampled for the texture (for each texel) do not need to fall exactly on the walls of the bounding volume 20 but can be on, outside of or inside the bounding volume. The output 47 of this cube texture generation process is then the cube texture as shown in FIG. 4, which represents the surface of the bounding volume for the scene that the cube texture relates to at respective positions on the surface of the bounding volume.

As shown in FIG. 5, once the cube texture has been generated, it may optionally be subjected to various processing effects and optimisations, such as blurring, gamma correction, brightness and/or contrast enhancement, etc. (step 43). This step uses as inputs desired post-processing effect parameters, such as blurring parameters, gamma correction parameters, contrast parameters, etc.

Furthermore, as shown in FIG. 5, the generated (and if desired post-processed) cube texture can be compressed (step 45), using desired compression parameters 46. Any suitable texture compression scheme can be used to compress the cube texture.

The cube texture generation and any post-processing/compression of the cube texture can be performed as desired and using any suitable processing system. In an embodiment the cube texture is generated "offline" and stored, and then provided to the graphics processing pipeline for use when it is required.

In an embodiment, as well as generating the textures, the first and second bounding volumes that the textures represent (are to be used with) are also generated and stored. In an embodiment data defining the first and second bounding volumes is generated and stored in association with (associated with) the textures. Again, this bounding volume information can be subject to any desired post-processing operations, such as compression, if desired.

As discussed above, the present embodiment relates to arrangements for determining the effects of reflections, e.g. from the reflective surface 21 as seen from the viewpoint (camera) position 22 for the scene. The use of the distance texture and the cube texture shown in FIG. 4 to determine the effect of reflections within the bounding volume 20 will now be described with reference to FIG. 2.

The present embodiment operates to determine for respective sampling points on the reflective surface 21, the effect of reflections using the cube texture 30. FIG. 2 shows the process for a given sampling point 23. This process is repeated for each sampling point on the reflective surface 21.

The process starts by determining the reflected vector 24 for the sampling point 23 that is being considered. This process is based on the law of reflection, and uses as its input the vector 25 from the viewpoint (camera) position 22 for the scene to the sampling point 23, and the normal 26 of the surface at the sampling point 23.

The next step is to apply a "local correction" to the reflected vector 24 to ensure that the correct position within the cube texture 30 is sampled. This is required, because, as can be seen from FIG. 2, for example, the reference position 31 that the cube texture is sampled from (with respect to) may not (and typically will not) correspond to the sampling position 23 being considered, such that simply taking the reflected vector 24 and using that to sample from the reference position 31 for the cube texture 30 will not sample the correct part of the cube texture.

To apply this "local correction", as shown in FIG. 2, the intersection point 27 on the surface of the bounding volume 20 of the reflected vector 24 is firstly (approximately) determined. As will be described in more detail below, this is done by determining and using the intersection point 51 of the reflected vector 24 on the surface of a bounding sphere 50 that encompasses the first bounding volume 20. The vector 28 from the reference position 31 that the cube texture 30 is defined with respect to the intersection point 27 on the first bounding volume 20 is determined, and that vector 28 is then used to sample the cube texture 30. This will, accordingly, and as can be seen from FIG. 2, sample the cube texture 30 at the intersection position 27 that corresponds to the portion of the surface of the bounding volume 20 that is intersected by the reflected vector 24.

The cube texture 30 is then sampled at the position corresponding to the intersection position 27 to determine the colour and/or transparency of the surface of the bounding volume 20 at that point. The cube texture 30 can be sampled using any desired texture sampling (filtering) process, such as bilinear and/or tri-linear filtering (e.g. in the case where the cube texture 30 is in the form of mipmaps). The filtering may, e.g., be provided by a texturing module (stage) of the graphics processing pipeline. This then gives a colour value that can be used to simulate the effects of reflection at the sampling point 23.

This process is then repeated for the sampling points for all the primitives on the reflective surface 21 that are to be rendered (and then for the next frame (if appropriate), and so on).

Figure 6:
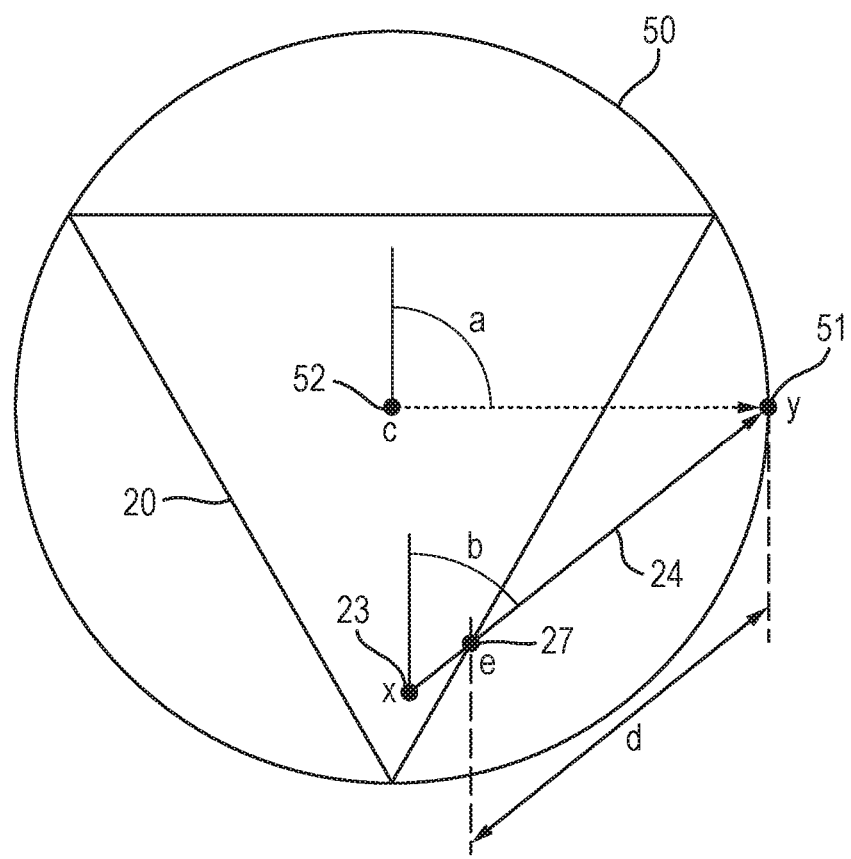
FIG. 6 illustrates the operation of an embodiment of the technology described herein.

The use of the intersection point 51 of the reflected vector 24 on the surface of the bounding sphere 50 and the distance texture associated with the bounding sphere 50 to approximately determine the intersection point 27 on the surface of the first bounding volume 20 of the reflected vector 24 will now be described in more detail with reference to FIG. 6. FIG. 6 shows a schematic two-dimensional representation of the scene, where the first bounding volume 20 is shown a triangle and the bounding sphere 50 is shown as a circle that encompasses the bounding volume 20.

In the present embodiment, the intersection point 51 on the surface of the bounding sphere 50 of the reflected vector 24 from the sampling point 23 is used to determine the unit direction vector a between the centre point 52 of the bounding sphere 50 and the intersection point 51. This intersection point 51 is analytically calculated using as inputs the radius and the centre point 52 of the bounding sphere 50, and the origin 23 and direction of the vector 24. The unit direction vector b of the reflected vector 24 is also determined.

The unit direction vectors a and b are then converted into respective pairs of spherical coordinates, and the spherical coordinates are used to look up a distance value from the distance texture. The first two texture coordinates (x, y) may be the spherical coordinates of the direction of the vector a between the centre 52 and intersection point 51 of the bounding sphere 50, and the next two texture coordinates (z, w) may be the spherical coordinates of the direction b of the reflected vector 24. The looked up distance value will (approximately) correspond to the distance d from the position 51 on the second bounding volume 50 intersected by the vector 24 to the position 27 on the first bounding volume 20 intersected by the vector 24 for the particular combination of the position 51 on the second bounding volume 50 intersected by the vector 24 and the direction of the vector 24 in question.

Where the texture comprises a 2D or 4D texture, the texture look up may be a 2D or 4D texture look up. Where the texture comprises a 3D texture comprising flattened 4D distance information (e.g. where there is no hardware support for 4D textures) two 3D texture lookups may be performed and results may be appropriately interpolated.

Using the determined distance d, the approximate coordinates of the position 27 on the first bounding volume 20 intersected by the vector 24 can then be calculated by multiplying the unit direction vector of the vector 24 with the distance obtained from the texture, and subtracting this resultant vector from the position 51 on the second bounding volume 50 intersected by the vector 24.

Various modifications, additions and alternatives to the above-described embodiments of the technology described herein would be possible, if desired.

In particular, although the above embodiment has been described in terms of taking account of the effects of reflections in a scene being rendered, the techniques of the technology described herein can be used in a number of other arrangements.

For example, the techniques of the technology described herein may be used in other environment mapping techniques, such as the Applicant's shadow mapping techniques described in GB 1413145.2, and the Applicant's refraction mapping techniques described in GB 1503391.3 and GB 1503386.3.

The techniques of the technology described herein may also be used to detect collisions between particles and an environment, e.g. for in-game effects. In this case, the intersection position of a particle velocity vector on a bounding volume may be determined and used to determine whether the particle will collide with the environment, e.g. within a given time period.

Although the above embodiment has been described in terms of the use of a distance-indicating texture that includes plural distance values to determine the position 27 on the first bounding volume 20 intersected by the vector 24, it would also be possible for the texture to instead include plural position values (e.g. coordinates) that (approximately) correspond to the coordinates of the position 27 on the first bounding volume 20 intersected by the vector 24 for the particular combination of the position 51 on the second bounding volume 50 intersected by the vector 24 and the direction of the vector 24 in question. In this case, the spherical coordinates can be used to look up the position value from the texture. As will be appreciated by those having skill in the art, this would then reduce the number of calculations required at run-time (since it would not then be necessary to calculate the coordinates of the position 27 using the distance d), but at the expense of requiring more data to be stored in the texture and increased memory bandwidth.

As can be seen from the above, the technology described herein, in its embodiments at least, provides an effective, and processing efficient, mechanism for determining the intersection point of a vector on a volume, that can allow higher quality environment mapping rendering to be achieved in a bandwidth and processing efficient manner.

This is achieved, in the embodiments of the technology described herein at least, by determining the position intersected by the vector on a second bounding volume associated with the first bounding volume, using the determined position to determine information indicative of a position intersected on the first bounding volume by the vector, and using the determined information to determine a position on the first bounding volume intersected by the vector.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system when rendering a scene for output, in which a first bounding volume representative of the volume of all or part of the scene to be rendered is defined; the method comprising:
   determining an intersection position for a vector with the first bounding volume by:
   determining the position intersected by the vector on a second bounding volume associated with the first bounding volume, wherein the second bounding volume at least partially bounds and/or is at least partially bounded by the first bounding volume;
   using the determined position to determine information indicative of an intersection position for the first bounding volume and the vector by using the determined position to look up the information from pre-determined information, wherein the pre-determined information comprises information indicative of an intersection position on the first bounding volume for a vector for each of plural combinations of the position on the second bounding volume intersected by the vector and the direction of the vector; and
   using the determined information to determine an intersection position for the vector with the first bounding volume.

2. The method of claim 1, wherein the first bounding volume comprises a convex volume.

3. The method of claim 1, wherein the second bounding volume has a form that is relatively simple compared to the form of the first bounding volume.

4. The method of claim 1, wherein the direction of the vector is used in determining the information indicative of an intersection position for the first bounding volume and the vector.

5. The method of claim 1, wherein the pre-determined information comprises a 3D array of 4D pre-determined information.

6. The method of claim 1, wherein the pre-determined information comprises a graphics texture, and the information indicative of an intersection position for the first bounding volume and the vector is looked up by sampling the graphics texture.

7. The method of claim 6, further comprising:
   generating the graphics texture, the graphics texture comprising an array of texture texels, by:
   setting texel values in the texture such that each texel stores a value indicative of an intersection position on the first bounding volume for a vector for a particular combination of the position on the second bounding volume associated with the first bounding volume intersected by the vector and the direction of the vector; and
   storing data representing the texel values of the texture.

8. The method of claim 1, wherein the information indicative of an intersection position for the first bounding volume and the vector comprises position information.

9. The method of claim 1, wherein the information indicative of an intersection position for the first bounding volume and the vector comprises distance information, and the method comprises:
   using the determined position to determine a distance value indicative of the distance from the determined position intersected on the second bounding volume by the vector to an intersection position for the first bounding volume and the vector; and
   using the determined distance value to determine an intersection position for the vector with the first bounding volume.

10. A graphics processing unit comprising:
    processing circuitry configured to determine an intersection position for a vector with a first bounding volume representative of the volume of all or part of a scene to be rendered by:
    determining the position intersected by the vector on a second bounding volume associated with the first bounding volume, wherein the second bounding volume at least partially bounds and/or is at least partially bounded by the first bounding volume;
    using the determined position to determine information indicative of an intersection position for the first bounding volume and the vector by using the determined position to look up the information from pre-determined information, wherein the pre-determined information comprises information indicative of an intersection position on the first bounding volume for a vector for each of plural combinations of the position on the second bounding volume intersected by the vector and the direction of the vector; and using the determined information to determine an intersection position for the vector with the first bounding volume.

11. The graphics processing unit of claim 10, wherein the first bounding volume comprises a convex volume.

12. The graphics processing unit of claim 10, wherein the second bounding volume has a form that is relatively simple compared to the form of the first bounding volume.

13. The graphics processing unit of claim 10, wherein the direction of the vector is used in determining the information indicative of an intersection position for the first bounding volume and the vector.

14. The graphics processing unit of claim 10, wherein the pre-determined information comprises a 3D array of 4D pre-determined information.

15. The graphics processing unit of claim 10, wherein the pre-determined information comprises a graphics texture, and the information indicative of an intersection position for the first bounding volume and the vector is looked up by sampling the graphics texture.

16. The graphics processing unit of claim 10, wherein the information indicative of an intersection position for the first bounding volume and the vector comprises position information.

17. The graphics processing unit of claim 10, wherein the information indicative of an intersection position for the first bounding volume and the vector comprises distance information, and the processing circuitry is configured to:

use the determined position to determine a distance value indicative of the distance from the determined position intersected on the second bounding volume by the vector to an intersection position for the first bounding volume and the vector; and use the determined distance value to determine an intersection position for the vector with the first bounding volume.

18. A non-transitory computer readable storage medium storing computer software code which when executing on a processor performs a method of operating a graphics processing system when rendering a scene for output, in which a first bounding volume representative of the volume of all or part of the scene to be rendered is defined; the method comprising:

determining an intersection position for a vector with the first bounding volume by:

determining the position intersected by the vector on a second bounding volume associated with the first bounding volume, wherein the second bounding volume at least partially bounds and/or is at least partially bounded by the first bounding volume;

using the determined position to determine information indicative of an intersection position for the first bounding volume and the vector by using the determined position to look up the information from pre-determined information, wherein the pre-determined information comprises information indicative of an intersection position on the first bounding volume for a vector for each of plural combinations of the position on the second bounding volume intersected by the vector and the direction of the vector; and using the determined information to determine an intersection position for the vector with the first bounding volume.

* * * * *